Figure 1:
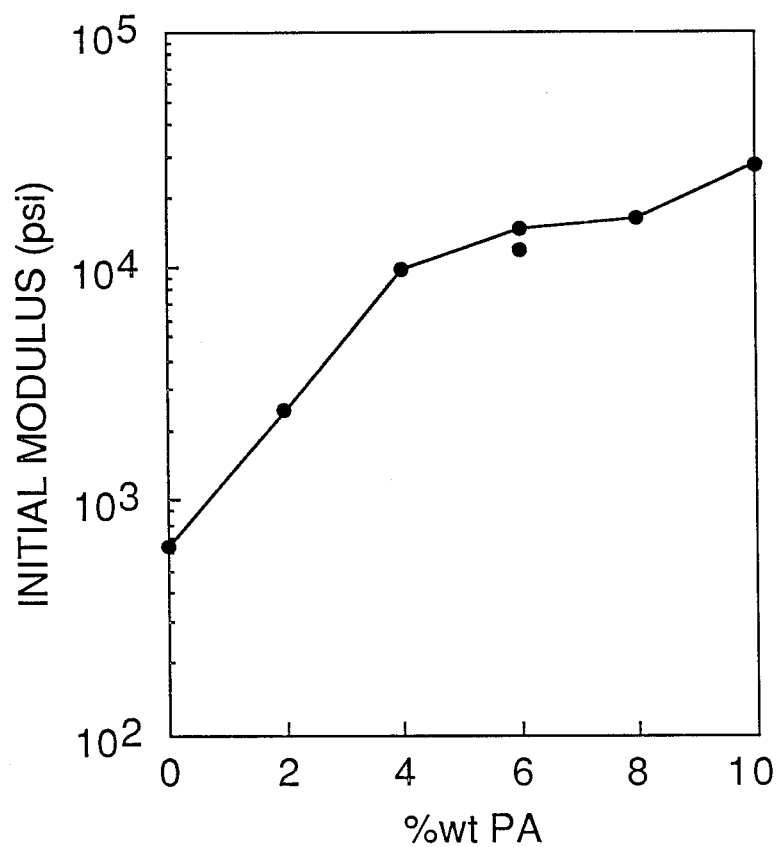

United States Patent [19]

Cotts et al.

[11] Patent Number: 4,857,569

[45] Date of Patent: Aug. 15, 1989

[54] POLYMER ALLOY COMPOSITIONS OF ROD-LIKE AROMATIC POLYAMIDES AND POLYURETHANES

[75] Inventors: David B. Cotts; Louisa Brodrecht, both of Menlo Park, Calif.

[73] Assignee: SRI International, Menlo Park, Calif.

[21] Appl. No.: 78,335

[22] Filed: Jul. 27, 1987

[51] Int. Cl.$^4$ .............................................. C08L 75/04
[52] U.S. Cl. .................................. 524/104; 524/107; 524/115; 524/155; 524/211; 524/233; 524/538; 525/424
[58] Field of Search ................. 525/424; 524/104, 115, 524/107, 155, 211, 233

[56] References Cited

U.S. PATENT DOCUMENTS

| | | | |
|---|---|---|---|
| 4,107,131 | 8/1978 | Gergen et al. | 523/522 |
| 4,141,879 | 2/1979 | McCarroll | 524/196 |
| 4,169,866 | 10/1979 | von Bonin et al. | 525/131 |
| 4,369,285 | 1/1883 | Sanderson et al. | 524/538 |
| 4,377,546 | 3/1983 | Helminiak et al. | 264/232 |
| 4,415,693 | 11/1983 | Chen et al. | 524/198 |
| 4,419,499 | 12/1983 | Coran et al. | 525/424 |
| 4,448,936 | 5/1984 | Wang et al. | 525/424 |
| 4,487,888 | 12/1984 | Coran et al. | 525/132 |
| 4,555,552 | 11/1985 | Coran et al. | 525/456 |

FOREIGN PATENT DOCUMENTS

| | | | |
|---|---|---|---|
| 53-34884 | 3/1978 | Japan . | |
| 1518500 | 7/1978 | United Kingdom | 525/424 |
| 0001029 | 11/1979 | World Int. Prop. O. . | |

OTHER PUBLICATIONS

Takayanagi et al., "Polymer Composites of Rigid and Flexible Molecules: System of Wholly Aromatic and Aliphatic Polyamides", *J. Macromol. Sci.-Phys.*, B17(4), 591–615 (1980).

W. W. Adams, "Morphology of a Phase Separated and a Molecular Composite. . . ", *AFWAL-TR-87-4020* (Jan. 1987).

Takayanagi et al., "Polymer Composite of Rigid and Flexible Molecules. . . ", *Journal of Applied Science*, vol. 29, 2547–2559 (1984).

Hwang et al., "Composites on a Molecular Level . . . ", *J. Macromol. Sci.-Phys.*, B22(2), 231–257 (1983).

Uchida et al., ". . . Composites of Poly (p-Phenylene Terephthalamide) and Poly (Vinyl Chloride)", *Reports on Progress in Polymer Physics in Japan*, vol. XXVI (1983).

Flory, "Statistical Thermodynamics of Mixtures of Rod-Like Particles . . . ", Stanford University (06/08/78).

Eisenberg et al., "Compatibilization of the PS/EA/PS/PI System . . . ", *Polymer Engineering and Sci.*, vol. 22, No. 17 (12/82).

Krause, "Tables of Polymers That May Be Compatible At Room Tem.", *Polymer Blends*, vol. I (1978).

Utracki, "Economics of Polymer Blends", *Polymer Eng. and Sci.*, vol. 22, No. 17 (12/82).

Kamal et al., "Some Solid-State Properties of Blends of Polyethylene Terephthalate and Polyamide-6,6", *Polymer Engineering and Science*, vol. 22, No. 17 (1982).

Scott, "The Thermodynamics of High Polymer Solutions. V. Phase Equilibria in the Ternary System: Polymer 1-Polymer 2-Solvent", *The Journal of Chemical Physics*, vol. 17, No. 3 (3/49).

*Primary Examiner*—John C. Bleutge
*Assistant Examiner*—A. Carrillo

[57] ABSTRACT

A novel thermoplastic composition is prepared by intimately mixing a polyurethane component with a selected reinforcing amount of a rod-like aromatic polyamide component. The composition exhibits unexpected tensile and modulus properties.

10 Claims, 4 Drawing Sheets

POLYMER ALLOY COMPOSITIONS OF ROD-LIKE AROMATIC POLYAMIDES AND POLYURETHANES

TECHNICAL FIELD OF INVENTION

The present invention relates to engineering thermoplastic polymer blends having high strength and high modulus and a process for making such blends. The blends are useful for making high performance fibers, films, sheets, rods, and other articles of manufacture.

BACKGROUND ART

Attempts have been made to prepare materials with improved properties based on the commercial rod-like polymer poly(p-Phenylene Terephthalamide) (PPTA) with various other polymers. These include: PPTA with nylon 6 and nylon 66 by Takayanagi et al (J. Macro Sci. Phys., B17(2), 519, 1980); PPTA with polyvinyl chloride (PVC) by Takayanagi et al (Report on Progress in Polymer Physics in Japan, 26, 319, 1983); PPTA with acrylonitrile-butadiene-styrene (ABS) resins by Takayanagi et al (J. Applied Polymer Sci., Vol. 29, 257-2559, 1984); and Japanese Pat. No. 0,034,884 which describes forming a composite material of PPTA with epoxy resins in the presence of lactam and isocyanate compounds. Blends containing thermosetting resins cannot be readily melt processed and the nylon-PPTA and PVC-PPTA blends show only slightly improved properties.

Other materials, such as solvent-blended polyurethane with polyethylene terephthalate and/or nylon 6 or nylon 66, as described in U.S. Pat. No. 4,448,936 are useful for making leather-like fabrics and do not exhibit the properties of high performance engineering thermoplastics. Engineering properties, however, can be achieved by physically blending nylon and polyurethane with an added amount of chopped glass fibers as described in U.S. Pat. No. 4,141,879.

DISCLOSURE OF INVENTION

OBJECTS OF INVENTION

Accordingly, it is an object of the present invention to provide thermoplastic compositions substantially free of one or more of the disadvantages of prior art compositions.

Another object is to provide thermoplastic compositions of high tensile strength.

Yet another object is to provide thermoplastic compositions of high modulus.

A still further object is to provide thermoplastic compositions which are melt-processable.

Another object is to provide thermoplastic compositions suitable for engineering use.

Other objects, aspects and advantages of the invention will become apparent to those skilled in the art upon consideration of the accompanying disclosure.

STATEMENT OF INVENTION

In accordance with the present invention, we have unexpectedly discovered that a high performance thermoplastic composition having a novel combination of properties can be provided by solution-blending one or more thermoplastic polyurethane components and a reinforcing amount of one or more rod-like aromatic polyamide components.

FIGURES

Figure 2:
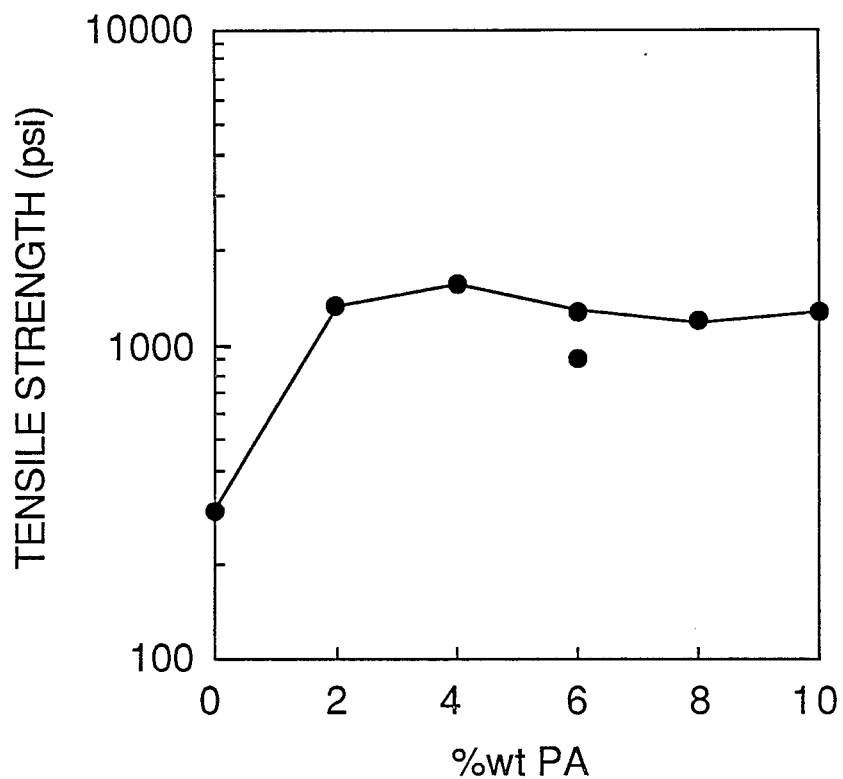
Figure 3:
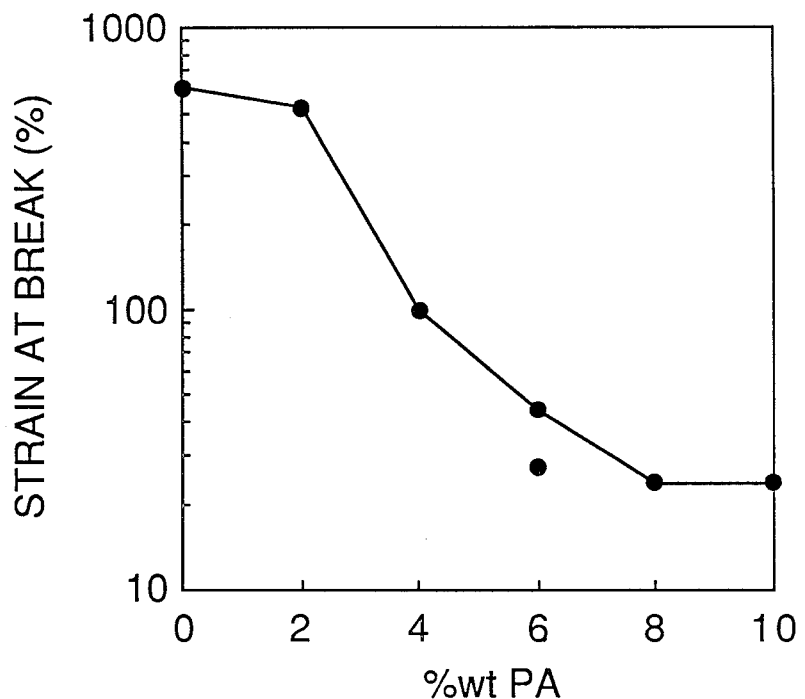
Figure 4:
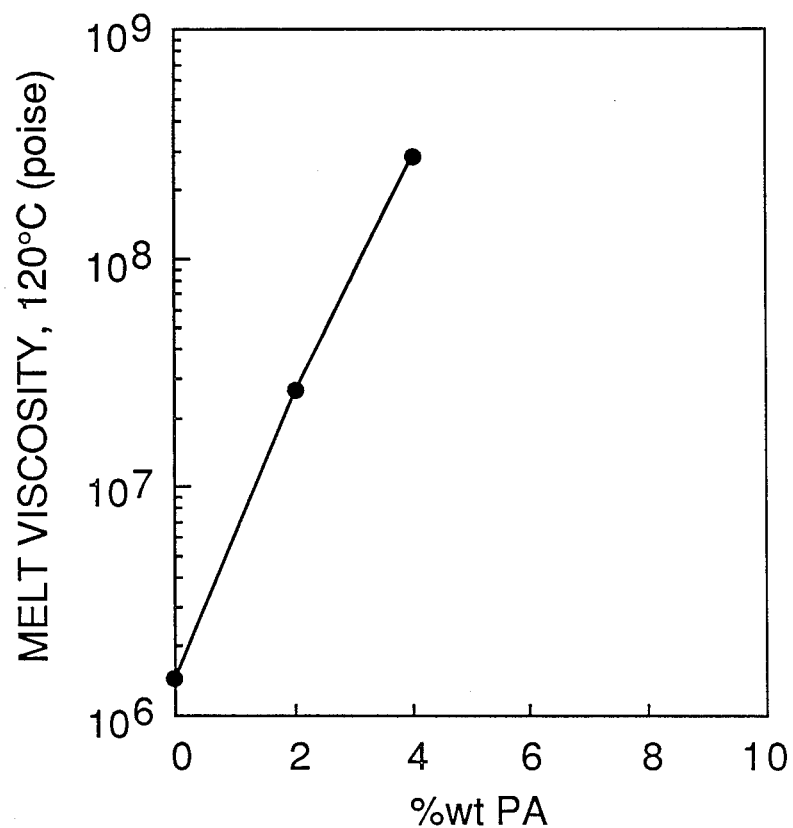

The invention will be more fully explained with reference to the figures wherein:

FIG. 1. graphically illustrates the improvement in initial modulus with increasing amounts of a rod-like aromatic polyamide incorporated into a low modulus polyurethane;

FIG. 2. graphically illustrates the improvement in tensile strength with increasing amounts of a rod-like aromatic polyamide incorporated into a low modulus polyurethane;

FIG. 3. graphically illustrates the change in percent of strain at break with increasing amounts of a rod-like aromatic polyamide incorporated into a low modulus polyurethane;

FIG. 4. graphically illustrates the increase in melt viscosity with increasing amounts of a rod-like aromatic polyamide incorporated into a low modulus polyurethane.

MODES FOR CARRYING OUT THE INVENTION

ROD-LIKE AROMATIC POLYAMIDES

Polyamides suitable for use in the present invention are rod-like aromatic polyamides. Examples of these polymers include poly(p-phenylene terephthalamide), poly(m-phenylene isophthalamide), a copolymer comprising m-phenylene terephthalamide and isophthalamide, poly(m-phenylene isophthalamide) with p-phenylene, p-phthaloyl, or 4,4'-diaminodiphenyl ether groups, polybenzamide, and the like. Such polymers and the method of their production are described in the following patents: U.S. Pat. Nos. 3,600,350; 3,063,966; 3,836,498; 3,991,016; JP KOKAI 49-124327; JP KOKI 49-134922; JP KOKAI 50-9695; JP KOKAI 51-73597; JP KOAKI 53-79948; JP KOKAI 54-27022; JP KOKAI 54-53192; JP KOAKI 54,68411; NE 148,339; UK 1,259,788; JP KOKAI 50-98; JP KOKAI 50-97; JP KOKAI 50-117896; U.S. Pat. No. 4,018,735; JP KOKAI 51-23599; U.S. Pat. No. 4,075,172; EP 45,934; JP 48-897; U.S. Pat. No. 3,966,686; JP KOKAI 52-84246; JP KOKAI 52-85251; JP KOKAI 54-106564; JP KOKAI 55-22052; JP KOKAI 51-112898; JP KOKAI 52-1130; JP KOKAI 52-151392; JP KOKAI 56-9425; JP KOKAI 49-100322; JP KOKAI 50-109288; U.S. Pat. No. 3,775,361; JP KOKAI 52,71597; JP 51,134792; U.S. Pat. Nos. 4,196,144; 3,827,998; JP 50-21519; JP KOKAI 56-88427; JP 52-39879; and JP KOKAI 50-78696. These patent documents are herein incorporated by reference.

Several rod-like aromatic polyamides are available from Du Pont de Nemours under the tradenames KEVLAR, KEVLAR 29, KEVLAR 49, KEVLAR 149, NOMEX; from Akzo Nederland BV and NL Enka BV under the tradename TWARON; from USSR (State) under the tradenames FENYLEND and FENYLENE ST; and from Teijin under the tradenames TEIJICONEX and HM-50.

THERMOPLASTIC POLYURETHANES

The polyurethanes employed in this invention are thermoplastic rather than thermosetting. They include the three generic classes of poly-ether, poly-caprolactam, and poly-ester polyurethanes, prepared by condensing diisocynate monomers with diols, diamines, and mixtures of the two.

Suitable polyurethanes useful in the present invention include those described in the following patents: U.S. Pat. Nos. 4,256,869; 4,442,281; DE Offen. 2,447,368; DE Offen. 2,610,980; U.S. Pat. Nos. 4,098,773; 4,191,818; DE Offen. 2,910,769; DE Offen. 3,028,501; U.S. Pat. Nos. 4,334,034; 4,448,946; DE Offen. 3,224,324; DE Offen. 3,329,775; U.S. Pat. Nos. 4,476,253; 4,250,292; 4,371,684; DE Offen. 2,418,075; DE Offen. 2,549,372; U.S. Pat. No. 4,245,081; JP Kokai 55-166-016; JP Kokai 59-226,017; JP Kokai 56-151,747; JP Kokai 58-157,814; JP Kokai 59-12,918; JP Kokai 59-159817; BE 862,915; U.S. Pat. Nos. 4,442,039; 4,349,657; UK 1,577,222; U.S. Pat. Nos. 4,129,611; 4,071,505; 4,124,574; 4,447,590; 3,983,094; UK 1,550,098; U.S. Pat. Nos. 4,041,105; 4,124,572; 3,899,467; U.S. Pat. No. Re. 31,671; U.S. Pat. Nos. 3,929,732; 4,169,196; 4,306,052; and 4,379,904. These patent documents are incorporated herein by reference.

Various thermoplastic polyurethanes are available from K. J. Quinn Co. under the tradename Q-THANE (various grades); B. F. Goodrich under the tradename ESTANE (various grades); Mobay Chemical under the tradename TEXIN (various grades); A. Schulman under the tradename TPP 293-01; Permuthane under the tradenames U23-800, U24-206, U24-303, U24-700, U24670, U25-405; Thermedics under the tradename TECOFLEX (various grades), TECFLIX under the tradename (various grades); Dow Chemical under the tradename PELLETHANE (various grades); Petrarch under the tradename RIMPLAST; Prolastomer under the tradename PROLASTIC; LNP under the tradename TF, TFL, and TL (various grades); Polymer Compos. under the tradenames PUGL-40, PUKV-20; BASF under the tradename ELASTOLLAN C (various grades); and Wilson-Fiberfil under the tradename URAFIL.

SOLVENTS

Suitable solvents for use in forming the compositions of the present invention include dimethylformamide, dimethylacetamide, dimethylsulfoxide, tetramethylurea, hexamethylphosphoramide, N-methylpyrrolidone, N-acetylpyrrolidone, N-diethylacetamide, dimethylacetamide, hexamethylphosphoramide-γ-lactone and the like. Mixtures of these solvents, and combinations of these solvents with inorganic salts such as lithium and calcium chloride can also be utilized.

PREPARATION

The compositions of the invention can be formed either by blending two individual solutions of the polyurethane and rod-like polyamide components in a common or mutually compatible solvent, or by polymerizing the polyurethane components in a solvent which is itself a solution of the rod-like polyamide component in a suitable solvent.

The resulting solution containing the components then can be processed by various methods. It can be precipitated by pouring into a suitable nonsolvent such as water, methanol, acetone or other suitable liquid, washed, collected, dried, and melt-processed by melt-spinning, extrusion, or molded into useful articles of manufacture. Alternatively, the solution may be cast into tough films and/or coatings by coating a suitable form with the solution and removing the solvent by a combination of elevated temperature and reduced pressure. In another method, the polymer alloy composition solution can be spun directly into fibers by extrusion through a small diameter orifice, coagulation in a suitable nonsolvent, and collection. Articles produced by these methods show significant improvement in mechanical properties with no significant loss of processability.

We have found that a reinforcing amount of about 1 to about 15 weight % of a rod-like aromatic polyamide, when incorporated into the thermoplastic polyurethane component of our invention, will result in a composition having special advantages. More specifically, a reinforcing amount of about 2 to about 10 weight % of a rod-like aromatic polyamide will provide a composition with tensil and modulus properties substantially greater than the polyurethane component alone. For a 3 to 10 weight % amount of a rod-like aromatic polyamide, the modulus of the compositions of the invention can be increased to better than 1,000% above the polyurethane component.

ADDITIVES

The compositions of this invention can also contain small amounts of conventionally employed additives such as stabilizers, antioxidants, colorants, flame retardants, fillers, and the like to an extent not affecting or decreasing the desired properties of the present invention. Additives useful in the compositions of the present invention include: silica, carbon black, alumina, kaolin, mica, organic and inorganic colorants, plasticizers, fungicides, bacteriostats, steric acid, Zn sterate and the like.

INDUSTRIAL APPLICABILITY

The compositions of the present invention are useful in various mechanical applications requiring vibration damping. Such application include interior and external parts for aeroplanes, automotive body parts, hoods, fenders and the like. The compositions are also useful in the medical field including tubing for fluids, prosthesis, implants (catheters and membranes), etc.

The invention is further illustrated by means of the following illustrative embodiments, which are given for purpose of illustration only and are not meant to limit the invention to the particular components and amounts disclosed.

EXAMPLE 1

Polyurethane (PU) and rod-like polyamide (PA) solutions are mixed to yield polymer blends varying in PA concentration from 0–10%. The individual solutions are prepared as follows:

A stock solution containing 100 g PU is prepared by dispersing 33.3 g (0.127 moles) of freshly distilled methylene bis-(4-cyclohexyl isocynate) (Hylene W) and 62.9 g (0.063 moles) of freshly distilled polytetramethylene ether (Polymeg) in 850 mL of recently distilled 1-methyl-2-pyrrolidinone (NMP) in a dry, deaerated reaction flask equipped with overhead stirrer and thermometer. Approximately eight drops of dibutyltin dilaurate catalyst are added and the mixture is heated to 70° C. with constant stirring. Reaction is maintained for two hours, after which the mixture is allowed to cool. Then a chain extender is added on to the existing polymer structure by adding through a drop funnel a solution of 3.8 g (0.063 moles) of ethylene diamine in 50 mL of NMP. The temperature is raised to 85° C. and the reaction maintained for three hours. The PU solution is then allowed to cool. The weight of the total solution is 1015.5 g.

A stock solution containing 10 g of PA (polyparaphenyleneterephthalamide) is prepared by first cooling a mixture of 250 mL of dry NMP and 500 mL of hexamethylphosphoramide (HMPA) to 0° C. in a dry, deaerated reaction flask equipped with an overhead stirrer and a thermometer. To the cooled solution are added 4.5 g (0.042 moles) of freshly sublimed p-phenylenediamine. After dissolution, 8.5 g (0.042 moles) of terephthaloyl chloride are also added. The temperature of the mixture is slowly raised to 70° C. and maintained for five hours. To dissolve the precipitated PA, 37 g (5 weight %) of lithium chloride are added. As the mixture cools, the PA goes into solution. The weight of the total solution is 1003.6 g.

A blend is prepared containing 2% PA by mixing a 101.5 g sample of the PU solution (containing 10.0 g of PU polymer) with a 20.1 g sample of the PA solution (containing 0.2 g of PA polymer). The resulting blend is precipitated into deionized water and chopped to small pieces in a Waring blender. The solids are extracted overnight with deionized water in a Soxhlet extractor and then dried under vacuum. The sample weighs 9.4 g, which represents a 92.2% yield.

EXAMPLE 2

Following the procedure of Example 1, a blend containing 10% PA is prepared by mixing 101.5 g of the PU solution (containing 10.0 g of PU) with 100.4 g of the PA solution (containing 1.0 g of PA). The resulting blend is precipitated into deionized water and worked up as described above. The yield of the polymer blend is 9.7 g or 88.2%.

EXAMPLE 3

Following the procedure of Example 1, a blend containing 4% PA is prepared by mixing 254 g of the PU solution (containing 24.0 g of PU) with 100 g of the PA solution (containing 1.0 g of PA). The resulting blend is precipitated into deionized water and worked up as described above. The yield of the polymer blend is 25 g or 100%.

EXAMPLE 4

The procedure of Example 1 is followed except that the PA stock solution is prepared by dissolving 10 g of commercial Kevlar yarn in 990 grams of a solvent composed of 90 grams of LiCl in 900 grams of NMP.

EXAMPLE 5

The procedure of Example 4 is followed except that 10 grams of Kevlar pulp is used instead of yarn.

EXAMPLE 6

Rather than blending appropriate amounts of two ready-made polymer solutions, another series of blends is prepared by synthesizing a polymer in a solution that is in itself already a polymer solution. This is accomplished by preparing the PU solution as described in Example 1 and adding to it the monomers needed for the PA.

A blend containing 2% is prepared by mixing 126.9 g of the PU solution prepared in Example 1 1 (containing 12.5 g of PU) with an additional 120 mL of dry NMP in a dry, deaerated reaction flask equipped with an overhead stirrer and a thermometer. The flask is cooled to 0° C. Freshly sublimed p-phenylenediamine (0.11 g, 0.001 moles) is added to the solution and the mixture stirred until the diamine is dissolved. The mixture is allowed to stir at room temperature for three hours. The resulting mixture is precipitated into deionized water and worked up as described in Example 1.

EXAMPLE 7

In the manner described in Example 6, a blend containing 10% PA is prepared by reacting 0.28 g (0.0026 moles) of p-phenylenediamine with 0.53 g (0.0026 moles) of terephthaloyl chloride in 63.0 g of the PU solution prepared in Example 1 (containing 6.2 g of PU). This polymer blend is also precipitated into deionized water and treated as in Example 1.

EXAMPLE 8

Block copolymers of PU and PA are prepared. A block copolymer composed of 70 weight % of PU and 30 weight % of PA is prepared by first synthesizing a PU prepolymer from freshly distilled 1,4-butanediol and hexamethylene diisocyanate. To a dry, deaerated reaction vessel equipped with overhead stirrer and containing 100 mL of recently distilled and dried NMP are added 2.74 g (0.0304 moles) of 1,4-butanediol and 4.26 g (0.0253 moles) of hexamethylene diisocyanate. A small amount (4 drops) of dibutyltin dilaurate catalyst are also added. The prepolymer is heated for 1.5 hours at 75° C. with constant stirring. Then 1.36 g (0.0126 moles) of freshly sublimed p-phenylenediamine and 3.59 g (0.0177 moles) of freshly sublimed terephthaloyl chloride are added to the flask and the mixture is allowed to come to room temperature while stirring for one hour. The block copolymer is precipitated into methanol, extracted with methanol in a Soxhlet extractor overnight, and dried under vacuum.

EXAMPLE 9

In the same manner as described in Example 8, a block copolymer containing 90 weight % PU and 10 weight % PA is prepared using 1.76 g (0.0195 moles) of 1,4-butanediol and 2.74 g (0.0163 moles) of hexamethylene diisocynate for the PU prepolymer, and 0.23 g (0.0021 moles) of p-phenylenediamine and 1.09 g (0.0054 moles) of terephthaloyl chloride to make the copolymer.

EXAMPLE 10

Rather than precipitating it into water, 100 g of the polymer blend solution prepared in Example 1 (containing 2% PA) is processed into a film by pouring the blend solution into a casting ring and evaporating the solvent under vacuum at 60° C. The resulting film is tough and flexible.

EXAMPLE 11

Another process is to extrude 100 g of the polymer blend solution from Example 1 through a single-hole spinnerette into a quenching bath of deionized water at room temperature to form composite fibers. The resulting fiber is wound onto a roll, which remains immersed in water overnight. It is then dried under vacuum.

EXAMPLE 12

The polymer blend prepared in Example 1 is also melt-extruded into a fiber by placing 10 g of the solid material in the barrel of a capillary viscometer and heating it to 120° C. The blend is extruded through a 0.05 cm orifice under a force of approximately 100 psi to yield a tough but flexible fiber. A series of mechanical tests are performed following the general procedures of ASTM D638. Tensile strength, elongation at break, and modulus measurements are performed with an Instron load frame and a 50-pound load cell. Melt viscosities are measured with a Theometrics Mechanical Spectrometer. Results showing synergistic interaction in properties for samples of the preferred compositions are summarized in FIGS. 1 to 4.

The prepolymer is heated for 1.5 hours at 75° C. with constant stirring. Then 1.36 g (0.0126 moles) of freshly sublimed p-phenylenediamine and 3.59 g (0.0177 moles) of freshly sublimed terephthaloyl chloride are added to the flask and the mixture is allowed to come to room temperature while stirring for one hour. The block copolymer is precipitated into methanol, extracted with methanol in a Soxhlet extractor overnight, and dried under vacuum.

EXAMPLE 13

In the same manner as described in Example 9, a block copolymer containing 90 weight % PU and 10 weight % PA is prepared using 1.76 g (0.0195 moles) of 1,4-butanediol and 2.74 g (0.0163 moles) of hexamethylene diisocyanate for the PU prepolymer, and 0.23 g (0.0021 moles) of p-phenylenediamine and 1.09 g (0.0054 moles) of terephthaloyl chloride to make the copolymer.

EXAMPLE 14

Rather than precipitating it into water, 100 g of the polymer blend solution prepared in Example 1 (containing 2% PA) is processed into a film by pouring the blend solution into a casting ring and evaporating the solvent under vacuum at 60° C. The resulting film is tough and flexible.

EXAMPLE 15

Another process is to extrude 100 g of the polymer blend solution from Example 1 through a single-hole spinnerette into a quenching bath of deionized water at room temperature to form a composite fiber. The resulting fiber is wound onto a roll, which remains immersed in water overnight. It is then dried under vacuum.

EXAMPLE 16

The polymer blend prepared in Example 1 is also melt-extruded into a fiber by placing 10 g of the solid material in the barrel of a Tinnius-Olsen capillary viscometer and heating it to 120° C. The blend is extruded under a force of approximately 100 psi to yield a tough but flexible fiber. A series of mechanical tests is performed. Tensile strength, elongation at break, and modulus measurements are performed with an Instron load frame and a 50-pound load cell. Melt viscosities are measured with a Rheometrics Mechanical Spectrometer.

EXAMPLE 17

84 weight percent of a commercial grade polyurethane, selected from the above list of thermoplastic polyurethanes, is dissolved in a suitable amount of solvent to form a urethane-solvent mixture. 4 weight percent of a polyamide, selected from the above list of commercially available rod-like aromatic polyamides, is then added to the urethane-solvent mixture to form a polymer blend. The resulting solvent free blend is found to have a modulus about 500% greater than the modulus of the thermoplastic polyurethane component of the blend.

Since certain changes in carrying out the invention may be made without departing from its scope, it is intended that all matter contained in the above description shall be interpreted as illustrative and not in a limiting sense.

Having fully disclosed our invention and provided teachings which will enable others to use our invention, the scope of our claims may now be understood as follows:

What is claimed is:

1. A novel engineering thermoplastic composition comprising a homogeneous polymer blend of at least two components:
   (a) one or more of a thermoplastic polyurethane and
   (b) a reinforcing amount of one or more of a rod-like aromatic polyamide; said polymer blend having an initial modulus of at least $10^3$ psi, a tensile strength of at least 400 psi, and a melt viscosity at 120° C. of at least $5 \times 10^6$ poise.

2. A composition of claim 1, wherein said rod-like aromatic polyamide is selected from one or more of the following:
   (1) poly(p-phenylene terephthalamide),
   (2) poly(m-phenylene isophthalamide),
   (3) a copolymer comprising m-phenylene, terephthalamide and isophthalamide,
   (4) poly(m-phenylene isophthalamide) with p-phenylene, p-phthaloyl, or 4,4'-diaminodiphenyl ether groups, or (5) polybenzamide.

3. A composition of claim 1, wherein said thermoplastic polyurethane component of said blend is about 85%–99% and said rod-like aromatic polyamide component of said blend is about 1%–15%.

4. A composition of claim 1, wherein said thermoplastic polyurethane component of said blend is about 90%–98% and said rod-like aromatic polyamide component of said blend is about 2%–10%.

5. A composition of claim 2, wherein said thermoplastic polyurethane component of said blend is about 85%–99% and said rod-like aromatic polyamide component of said blend is about 1%–15%.

6. A composition of claim 2, wherein said thermoplastic polyurethane component of said blend is about 90%–98% and said rod-like aromatic polyamide component of said blend is about 2%–10%.

7. A composition of claim 1, 2, 3, 4, 5, or 6, wherein said composition is formed from a solution of said thermoplastic polyurethane and a solution of said rod-like aromatic polyamide.

8. A composition of claim 1, 2, 3, or 4 wherein said composition is characterized as having a tensile strength of at least 200% greater than the tensile strength of the polyurethane component of the blend.

9. A composition of claim 1, 2, 3, or 4 wherein said composition is characterized as having a modulus of at least 150% greater than the modulus of the polyurethane component of the blend.

10. A composition of claims 1, 2, 3, 4, 5, or 6, wherein said composition is formed from a solution of said thermoplastic polyurethane and a solution of said rod-like aromatic polyamide, said solution of said thermoplastic polyurethane being formed by admixing said thermoplastic polyurethane in one or more of a thermoplastic polyurethane compatible solvent, said solution of said rod-like aromatic polyamide being formed by admixing said rod-like aromatic polyamide with one or more of a rod-like aromatic polyamide compatible solvent, said thermoplastic polyurethane compatible solvent or said rod-like aromatic polyamide compatible solvent comprising one or a mixture of two or more solvents selected from the following:
(a) dimethylformamide,
(b) dimethylacetamide,
(c) dimethylsulfoxide,
(d) tetramethylurea,
(e) hexamethylphosphoramide,
(f) N-methylpyrrolidone,
(g) N-acetylpyrrolidone,
(h) N-diethylacetamide,
(i) hexamethylphosphoramide-γ-lactone, or one or a mixture of one or more of
(a)–(i) with one or more of an inorganic salt.

* * * * *